United States Patent
Schwartz

(10) Patent No.: US 10,207,214 B2
(45) Date of Patent: Feb. 19, 2019

(54) FILTER WITH BIDIRECTIONAL PLEATED MEDIA

(71) Applicant: CUMMINS FILTRATION IP, INC., Columbus, IN (US)

(72) Inventor: Scott W. Schwartz, Cottage Grove, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 77 days.

(21) Appl. No.: 15/024,311

(22) PCT Filed: Sep. 29, 2014

(86) PCT No.: PCT/US2014/057986
§ 371 (c)(1),
(2) Date: Mar. 24, 2016

(87) PCT Pub. No.: WO2015/060996
PCT Pub. Date: Apr. 30, 2015

(65) Prior Publication Data
US 2016/0214053 A1   Jul. 28, 2016

Related U.S. Application Data

(60) Provisional application No. 61/893,577, filed on Oct. 21, 2013.

(51) Int. Cl.
*B01D 46/00* (2006.01)
*B01D 46/52* (2006.01)

(52) U.S. Cl.
CPC ....... *B01D 46/522* (2013.01); *B01D 46/0001* (2013.01); *B01D 46/523* (2013.01)

(58) Field of Classification Search
CPC .... B01D 46/522–46/523; B01D 46/01–46/05; B01D 46/23; B01D 2265/05; B01D 2275/203

(Continued)

(56) References Cited

U.S. PATENT DOCUMENTS 5,611,830 A * 3/1997 Ernst ................. B01D 46/0005
                                                           55/378
6,824,581 B1 * 11/2004 Tate ....................... B01D 46/10
                                                           210/487

(Continued)

FOREIGN PATENT DOCUMENTS

| CN | 102574043 | 4/2015 |
| DE | 42 08 862 | 9/1993 |
| WO | WO-2011/046782 | 4/2011 |

OTHER PUBLICATIONS

The International Search Report and Written Opinion of the International Search Authority issued in PCT/US2014/057986, dated Feb. 18, 2015.

(Continued)

*Primary Examiner* — Robert A Hopkins
(74) *Attorney, Agent, or Firm* — Foley & Lardner LLP

(57) ABSTRACT

Pleated air filters and methods of making the pleated air filters. The pleated air filter includes an air filter media sheet which is folded along a longitudinal centerline. The air filter media sheet is separated into a plurality of sections by hinges formed out of the air filter media sheet, with each section forming a pocket. The pleated air filter further includes a plurality of spacer elements, each spacer element positioned on an outer surface of a section or within a pocket. The pleated air filter includes a polyurethane seal. The air filter media sheet is alternately folded along the hinges to form a pleat block. The polyurethane seal is positioned on a side of the pleat block such that the polyurethane seal seals the side.

20 Claims, 3 Drawing Sheets

(58) Field of Classification Search
USPC .......................................... 55/495, 497, 521
See application file for complete search history.

(56) References Cited

U.S. PATENT DOCUMENTS

| | | |
|---|---|---|
| 2002/0166449 A1 | 11/2002 | Scanlon |
| 2004/0128988 A1* | 7/2004 | Frankle .................. B01D 39/12 |
| | | 60/297 |
| 2005/0072131 A1 | 4/2005 | Tate et al. |
| 2006/0283162 A1 | 12/2006 | Dent et al. |
| 2011/0083559 A1* | 4/2011 | Raether ................ B01D 46/125 |
| | | 95/273 |
| 2012/0276286 A1 | 11/2012 | Vijayakumar |

OTHER PUBLICATIONS

Notice on the First Office Action issued in Chinese Patent Application No. 2014800560745, dated Nov. 11, 2016.

\* cited by examiner

FILTER WITH BIDIRECTIONAL PLEATED MEDIA

CROSS-REFERENCE TO RELATED PATENT APPLICATIONS

This application is a U.S. National Stage of PCT Application No. PCT/US2014/057986, filed on Sep. 29, 2014, which claims priority and the benefit of U.S. Provisional Patent Application No. 61/893,577, entitled "FILTER WITH BIDIRECTIONAL PLEATED MEDIA," filed on Oct. 21, 2013, the contents of which are incorporated herein by reference.

TECHNICAL FIELD

This present application relates to air filters. More particularly, the present application relates to air filters which may be used to provide clean air to internal combustion engines and other devices.

BACKGROUND

Various conventional panel style air filter designs contain a pleated media pack. Areas of the media pack structure must be sealed with a compound such as hot melt adhesive. Additionally, the edges of the pleat packs are typically sealed with an adhesive such as hot melt adhesive. As the hot melt adhesive is applied to the media pack structure and the edges of the pleat packs, the adhesive may render a usable area of the filter media unusable by masking the filter media. Masked areas of the filter media reduce the overall efficiency and performance of the air filter. Further, hot melt adhesive is prone to becoming plugged and having air pockets in the dispensing system that cause sputtering when the hot melt adhesive is applied. These inconsistencies in the hot melt adhesive may cause an interruption or a break in the hot melt bead, which leads to a leak path through the filter. If a leak path exists in the filter, the filter's efficiency may be reduced.

In conventional panel style air filters, as the filter media loads with contaminant or as flow increases, unsupported media pack layers tend to collapse against each other. Masking off of usable filter media may occur where the packed layers are collapsed against each other, which may increase the resistance of flow through the filter media. The increased flow resistance may reduce the filter's efficiency and may reduce the filter life.

Still further, government regulations are driving changes in the available space for air filters in engine compartments. Conventional panel style air filters typically come in square, rectangular, or cylindrical shapes. Air cleaner designs with improved shape flexibility to fit available space envelopes within engine compartments may provide automobile designers with increased design options.

SUMMARY OF THE INVENTION

One embodiment relates to a pleated air filter. The pleated air filter includes an air filter media sheet divided into a plurality of panels by a plurality of hinges formed out of the air filter media sheet. The air filter media sheet is folded along a longitudinal centerline such that each of the plurality of panels forms a pocket in the filter media. The pleated air filter further includes a plurality of spacer elements, each spacer element positioned on an outer surface of a panel or within a pocket. The pleated air filter includes a polyurethane seal. The air filter media sheet is alternately folded along the hinges to form a pleated air filter block. The polyurethane seal is positioned on a side of the pleated air filter block such that the polyurethane seal seals the side.

Another embodiment relates to a method of making a pleated air filter. The method includes incorporating spacer elements on an air filter media sheet. The method further includes alternately folding the air filter media sheet along a plurality of hinges formed in the air filter media sheet to form a pleat block, wherein the spacer elements prevent folded sides of the air filter media sheet from contact each other. The method includes sealing all but one side of the pleat block. The method further includes attaching a polyurethane seal to the non-sealed side of the pleat block.

These and other features, together with the organization and manner of operation thereof, will become apparent from the following detailed description when taken in conjunction with the accompanying drawings.

DETAILED DESCRIPTION OF VARIOUS EMBODIMENTS

Referring to the figures generally, the various embodiments disclosed herein relate to a pleated air filter. The air filter includes a spacing element configured to maintain uniform spacing between stacked filter media layers when the air filter is folded into a designated shape. The air filter is pleated such that the air filter does not need to be folded and masked with hot melt adhesive, thereby eliminating unnecessary masking of filter media and maximizing the usable filter media area.

Figure 1:
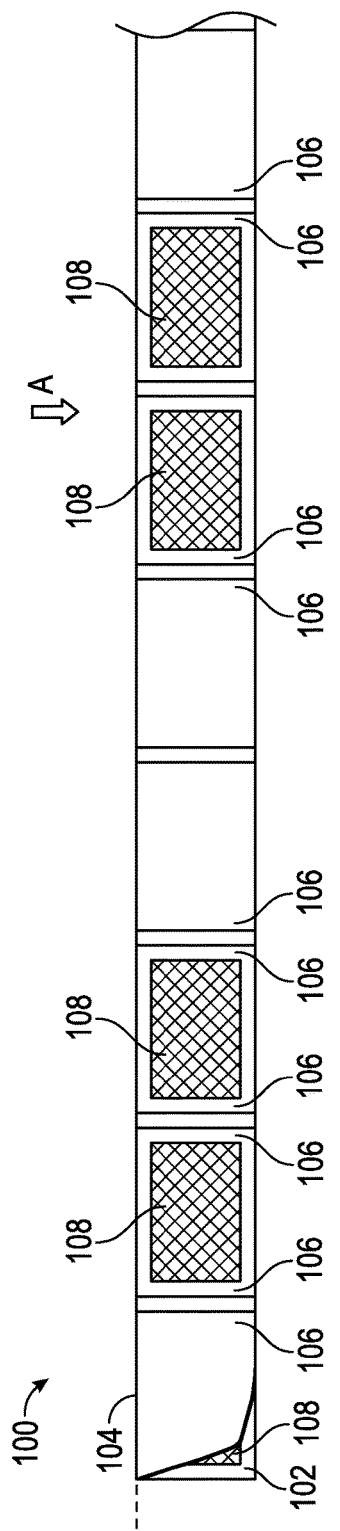
FIG. 1 is a side view of a pleated air filter sheet is shown according to an exemplary embodiment.
Figure 3:
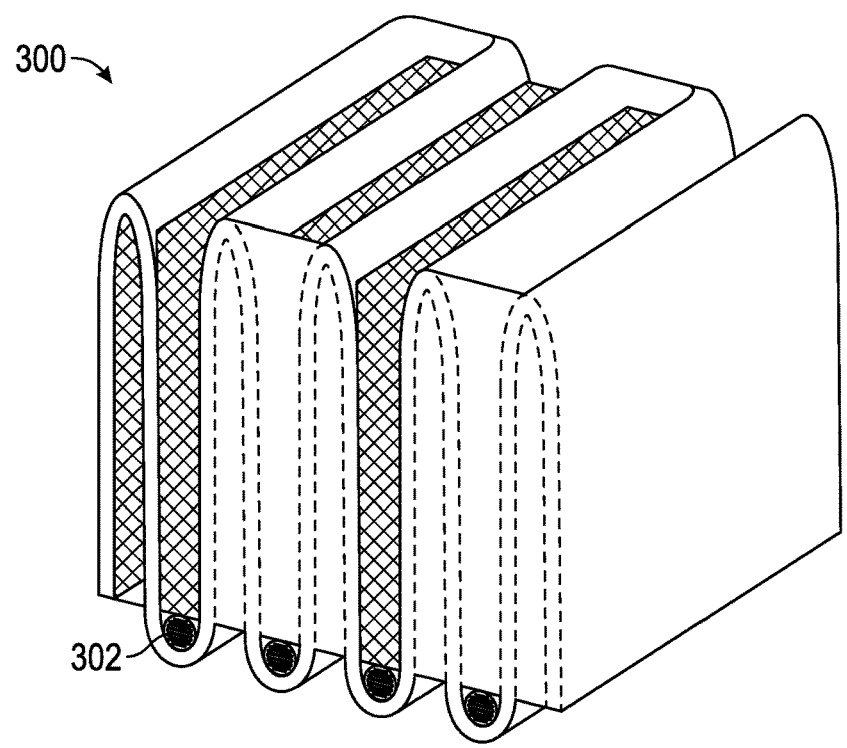
FIG. 3 is a perspective view of a folded air filter sheet forming a pleated air filter block according to an exemplary embodiment.

Referring to FIG. 1, a pleated air filter sheet 100 is shown according to an exemplary embodiment. The pleated air filter sheet 100 is not yet folded into a filter block (e.g., as shown in FIG. 3). The pleated air filter sheet 100 includes a base sheet of air filter media 102. The air filter media 102 may be a paper-based media, a cotton-based media, a foam-based media, or any suitable filter media. The air filter media 102 is folded over along its longitudinal center line 104. The air filter media 102 may be scored along the longitudinal center line 104 prior to the folding. Accordingly, if a filter media pack having an overall height of approximately 150 mm is desired, a base sheet of air filter media that is 300 mm wide is used for creating the air filter sheet. Fingers or plates may be temporarily inserted between the folds to set the spacing of the plurality of panels 106 of the pleated air filter sheet 100. As described in further detail below, each of the panels 106 includes a spacer element 108.

Figure 2:
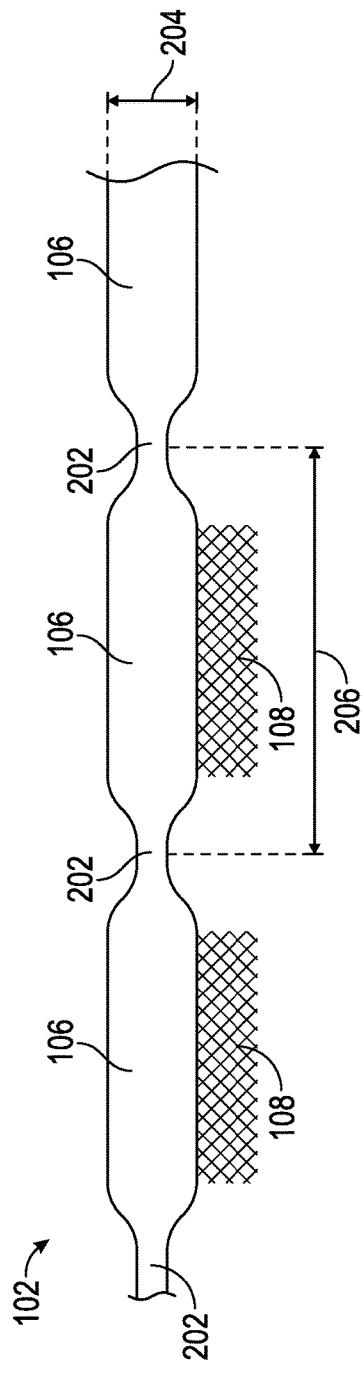
FIG. 2 is a top view of the pleated air filter sheet of FIG. 1.

FIG. 2 shows a top view of the pleated air filter sheet 100 in the direction of arrow A. As shown in FIG. 2, the pleated air filter sheet 100 is divided into a plurality of panels 106 by a plurality of scores that create hinges 202 in between successive panels 106. The hinges 202 are formed by sections of the air filter media 102. The hinges 202 may be formed by scoring the pleated air filter media sheet 100 perpendicular to the fold along the longitudinal centerline 104. The score may be made via a scoring roll or bar or the layers may be compressed and joined using ultrasonic welding or adhesive. The ultrasonic welding method may be preferable for synthetic media grades, whereas adhesive may be best suited for cellulose-based media. The width of the score (i.e., the width of the hinge 202) is approximately equal to two times the spacing between the layers or the thickness 204 of one complete pleat. Two individual scores may be used at the edges of the score zone. The distance 206 between the scores (i.e., the distance between adjacent hinges 202) controls the finished shape of the pleat block. If all scores are equally spaced (e.g., if distance 206 is a constant distance), a square or rectangular pleat block is produced (e.g., as shown in FIG. 3). By varying the length of the distance 206 between successive scores or hinges 202, an array of shapes may be created including but not limited to squares, rectangles, circles, ovals, octagons, and the like. Multiple pleat heights may also be created within the same element using this technique if multiple media webs are employed. Such an arrangement allows for the creation of a virtually unlimited number filter shapes. Accordingly, the finished air filter may be shaped into non-conventional air filter shapes such that the filter is customized to match an available space (e.g., a space in an engine compartment). A servo-controlled scoring mechanism linked to the speed of the media feed would provide a high degree of flexibility in score distances resulting in maximum design flexibility for pleat block shapes. Each panel 106 may also include support ribs on the ends to add strength.

Each panel 106 may include a spacer element 108. The spacer element 108 maintains substantially uniform spacing between individual panels 106 of the air filter when the air filter is folded (e.g., as shown in FIG. 3). As shown in FIG. 1, the spacer element 106 may comprise a spacer mesh. The spacer mesh may comprise a polymer spacer mesh. In an alternative arrangement, the spacer mesh extends across the length of the air filter sheet (i.e., the spacer mesh extends across the hinges 202 in a continuous manner). The spacer mesh may be placed on the outside of the folded air filter media 102 or within the pocket formed when the air filter media 102 is folded along the longitudinal center line 104 of the air filter media 102 (e.g., as shown on the far left panel 106 of FIG. 1). The spacer element 108 may be held in place with an adhesive (e.g., hot melt adhesive). The spacer element 108 may be a bead or dots of adhesive (e.g., hot melt adhesive). The spacer element 108 may be corrugations or embossments made in the air filter media.

The creation of uniform spacing is helps to ensure that all potential media area of each panel 106 is available for use. Accordingly, the uniform spacing maximizes dust capacity and minimizes restriction to air flow. In embodiments where a spacer mesh is use, the fibers of the spacer mesh may also aid in increasing dust loading by collecting some dust on its fibers and by causing the buildup of dust cake thickness where the fibers touch the air filter media 102. As dust loads on the upstream surface of the air filter media 102, the flow gap between the air filter media 102 layers narrows while the downstream side gap remains consistent. To offset this effect, the upstream thickness of the spacer element 108 may be slightly greater than the downstream thickness of the spacer element 108 in an air flow direction.

The first and last sections of each strip of the unfolded air filter sheet may be sealed together at the first and last score area of each pleat block (e.g., the outer edges of the first and last panels). The seal may be facilitated with an ultrasonic welding "seal and cut" technique. In alternative arrangements, the seal may be effectuated by a wide bead of adhesive may be applied prior to the primary fold. In such an arrangement, a cut may be made through the center of this adhesive band to create individual pleat blocks.

Figure 4:
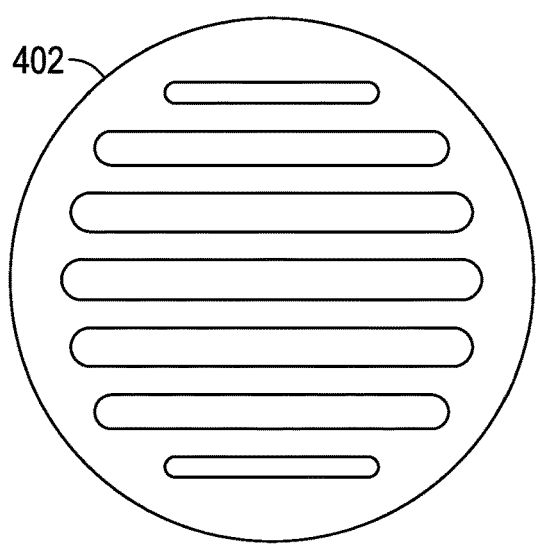
FIG. 4 is a top view of a urethane seal for an air filter block according to an exemplary embodiment.

Referring to FIG. 3, a perspective view of a fold air filter sheet forming a pleated air filter block 300 is shown according to an exemplary embodiment. The air filter sheet 100 of FIG. 1 is folded into the pleated air filter block 300. The pleated air filter sheet 100 is alternately bent at each score line (e.g., each hinge 202) and gathered into the pleat block 300. If adhesive beads or dots were used as the spacer elements 108, the adhesive beads would now be applied to the outer surface of the folded pleated air filter sheet 100 before the pleats are gathered. Similar to the primary lengthwise fold along the longitudinal centerline 104 of the air filter media 102, fingers or plates may be temporarily inserted between the folds to set the spacing until the adhesive sets. If polymer mesh or the corrugation and/or emboss method of spacing is used, tacking adhesive may be applied, if needed, to secure the pleats in position. Additionally, an adhesive bead may be applied over the tips of the pleats to secure them in place. A urethane seal 302 may be placed on the open end of the folded air filter pleat block. Although the pleated air filter block 300 is shown as being a square or rectangular block, the block 300 and urethane seal 302 may be shaped in other configurations. For example, and as shown in FIG. 4, a round urethane seal 402 may be applied to a bottom of a round pleated air filter block. The pleated air filter block of FIG. 4 may form racetrack shape.

In an alternative arrangement, a plurality of filter media pouches are made by folding the air filter media in half prior to feeding the air filter media through ultrasonic weld equipment that welds and cuts the sides of the individual pouches. Each pouch would then be arranged and ultrasonically welded to the adjacent pouch, creating a complete media pack.

Figure 5:
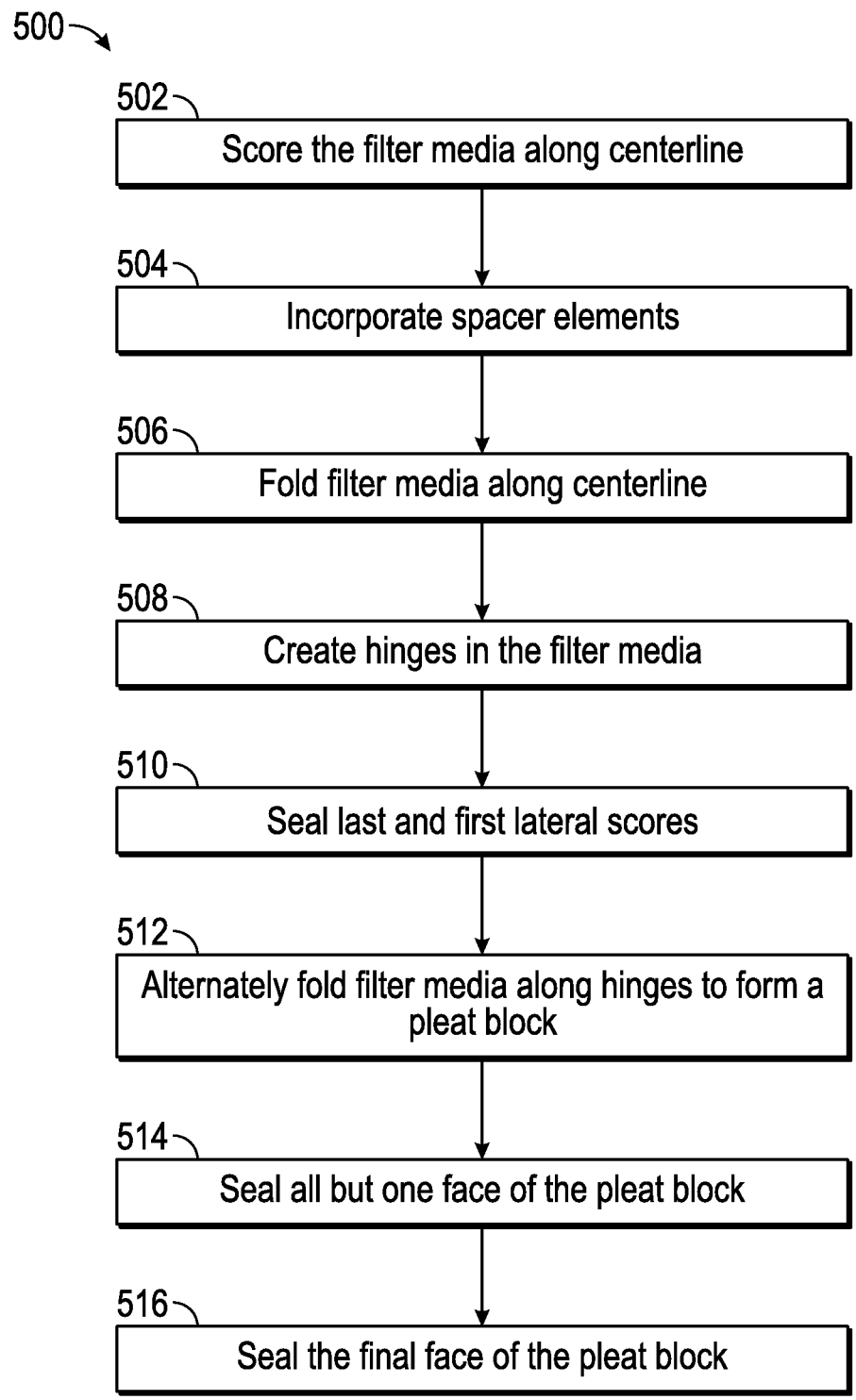
FIG. 5 is a flow diagram of a method of making an air filter according to an exemplary embodiment.

Referring to FIG. 5, a flow diagram of a method 500 of creating an air filter is shown according to an exemplary embodiment (e.g., any of the air filters described above with respect to FIG. 1 through FIG. 4).

The method begins at 500 when the filter media is scored along its longitudinal centerline (502). The filter media sheet may be scored as it is continuously fed forward through a processing machine. The score may be used in folding the filter media along its longitudinal centerline. In some arrangements, the scoring operation may be performed after spacer elements are incorporated and before the filter media is folded to create the pleat.

After the media sheet has been scored, media spacer elements are incorporated into the scored filter media (504). The media spacer elements (e.g., spacer elements 108) may comprise a polymer mesh material (e.g., Bonar EnkaMat 7400, StrataPore, etc.). The polymer mesh may be used as a continuous roll or as individual sheets, which are tacked to the media sheet via adhesive or ultrasonic welding. The polymer spacing mesh may be used on the upstream or downstream side (in the direction of air flow through the media) of the media. In some arrangements, the polymer spacing mesh may be used on both sides. On the upstream side, the mesh maintains uniform spacing between the media layers when the media is folded into a pleat block (e.g., as shown in FIG. 3). Creating uniform spacing helps to ensure that all of the potential media area is available for use in filtration. Accordingly, creating uniform spacing helps to maximize dust capacity and minimize restriction to air flow.

Additionally, the polymer spacing mesh increases dust loading by collecting some dust on the fibers of the mesh. Dust cake thickness may also slightly increase in the areas where the fibers touch the media, thereby further enhancing dust loading performance. As dust loads on the upstream surface of the media, the flow gap between the media layers narrows while the downstream side gap remains consistent. To offset this effect, the upstream thickness of the spacer element may be slightly greater than the downstream thickness of the spacer element. By using a series of spacing mesh thicknesses, a variety of element depths may be effectively used in the filter design.

In some embodiments, spacing mesh is not used. In some arrangements, the spacer element may be an adhesive (e.g., hot melt adhesive). Beads and/or dots of the adhesive may be applied to the media prior to folding. Temporary spacing fingers or plates may be inserted between media layers to keep space between the media layers while the adhesive sets. In other arrangements, the spacer element may be corrugated or embossed media. In such an arrangement, a small amount of tacking adhesive may be used to maintain the structure of the air filter as later folding steps take place. When embossing the media, the media pleat pitch is balanced with the length of the filter to optimize performance.

After the spacing elements are incorporated or attached to the filter media, the filter media sheet may be folded down the centerline (506). As noted above, the filter media sheet may have been scored at an earlier step in the manufacturing process. In some arrangements, the scoring takes place after the spacing elements have been incorporated or attached to the filter media. In arrangements where beads or dots of adhesive are used for the spacer elements, the fold needs to take place before the adhesive sets. In arrangements where the spacer elements are spacer mesh, corrugations, or embossments tacking adhesive may be applied.

After the filter media sheet is folded down the centerline (at 506), the sheet is scored to create hinges (e.g., hinges 202) in the filter media (508). In a particular embodiment, the sheet is scored substantially perpendicular to the feed direction (i.e., perpendicular to the centerline fold). In some arrangements, the score may be made via a scoring roll or bar. In other arrangements, the layers of filter media may be compressed and joined using ultrasonic welding. In other arrangements, an adhesive may be used to compress and join the layers of the filter media. The ultrasonic welding method may be preferred when the filter media is made from synthetic media. The adhesive may be preferred for cellulose-based media. The width of the score is approximately equal to two times the spacing between the layers (e.g., the front layer and the back layer) or the thickness of one complete pleat. Two individual scores could be used at the edges of the score zone. The distance between the scores controls the finished shape of the pleat block. If all scores are equally spaced, a square or rectangular pleat block is produced. A servo-controlled scoring mechanism linked to the speed of the media feed would provide a high degree of flexibility in score distances resulting in maximum design flexibility for pleat block shapes.

The first and the last hinge or lateral score are sealed (510). The seal may be facilitated with an ultrasonic welding "seal and cut" technique. In an alternative arrangement, a wide bead of adhesive may be applied prior to the primary fold. In such an arrangement, a cut may be made through the center of this adhesive band to create individual pleat blocks.

The filter media is folded along the hinges to form an air filter pleat block (e.g., as shown in FIG. 3) (512). The media may be alternately bent at each score line and gathered into a pleat block. If adhesive beads or dots are used as spacer elements, adhesive beads or dots may now be applied to the outer surface of the folded sheet before the pleats are gathered. Similar to the fold along the longitudinal centerline of the media, fingers or plates would be temporarily inserted between the folds to set the spacing until the adhesive sets. If polymer meshes, corrugations, or embossments are used, tacking adhesive may be applied, if needed, to secure the pleats in position. An adhesive bead may also be applied over the tips of the pleats to secure them in place.

After the filter media is folded to form the air filter pleat block, all but one of the filter media pleat block's faces is sealed (514). For example, if the pleat block is folded to form a cube (e.g., as shown in FIG. 3), five of the six faces may be sealed.

The last face is sealed (516). Attaching a polyurethane seal may seal the last face. The polyurethane seal may include a plurality of troughs. In addition to the typical trough in a conventional polyurethane mold, a series of smaller troughs are used to join the appropriate adjacent layers on the unsealed face, thereby sealing the individual pleat ends Using the smaller troughs may also achieve an ideal entry shape in the polyurethane seal. In alternative arrangements, the unsealed media layers on the last face could be joined by ultrasonic welding or with adhesive as the pleats are gathered. The sealing gasket would then need to be applied as a final step.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, materials, and configurations described herein are meant to be exemplary and that the actual parameters, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A pleated air filter comprising:
an air filter media sheet defining a longitudinal centerline, the longitudinal centerline extending longitudinally from a first end of the air filter media sheet to a second end of the air filter media sheet,
the air filter media sheet divided into a plurality of panels by a plurality of hinges formed from the air filter media sheet, each hinge in the plurality of hinges is formed perpendicular to the longitudinal centerline of the air filter media sheet and each hinge of the plurality of hinges is parallel to the first end and second end of the air filter media sheet,
the air filter media sheet folded along the longitudinal centerline such that each of the plurality of panels forms a pocket in the filter media such that the air filter media sheet comprises a plurality of pockets, wherein each pocket of the plurality of pockets has an opening opposite the longitudinal centerline;
a plurality of spacer elements, each of the plurality of spacer elements positioned on an outer surface of a panel or within each pocket of the plurality of pockets, wherein at least one spacer element is positioned within at least one of the plurality of pockets; and
a polyurethane seal,
wherein the air filter media sheet is alternately folded along the hinges of the plurality of hinges to form a pleated air filter block, and wherein the polyurethane seal is positioned on a side of the pleated air filter block such that the polyurethane seal seals the side.

2. The pleated air filter of claim 1, wherein the plurality of spacer elements comprise a polymer spacer mesh.

3. The pleated air filter of claim 1, wherein an upstream thickness of each spacer element is greater than a downstream thickness of each spacer element in an air flow direction.

4. The pleated air filter of claim 1, wherein the plurality of spacer elements comprise a bead or dots of adhesive.

5. The pleated air filter of claim 1, wherein outer edges of the first panel and the last panel of the plurality of panels are sealed.

6. The pleated air filter of claim 1, wherein a distance between adjacent hinges of the plurality of hinges is a constant distance.

7. The pleated air filter of claim 6, wherein the pleated air filter block is a rectangular or square block.

8. The pleated air filter of claim 1, wherein a distance between adjacent hinges of the plurality of hinges is a variable distance.

9. The pleated air filter of claim 8, wherein the pleated air filter block is a round block.

10. The pleated air filter of claim 1, wherein a width of each hinge in the plurality of hinges is approximately equal to two times a spacing between layers of the air filter media sheet.

11. A method of making a pleated air filter comprising:
folding an air filter media sheet along a longitudinal centerline, the longitudinal centerline extending longitudinally from a first end of the air filter media sheet to a second end of the air filter media sheet;

creating a plurality of hinges such that each hinge in the plurality of hinges is formed perpendicular to the longitudinal centerline and parallel to the first end and second end of the air filter media sheet, such that the plurality of hinges form a plurality of panels, folding the air filter media sheet along the longitudinal centerline such that each of the plurality of panels forms a pocket in the filter media such that the air filter media sheet comprises a plurality of pockets, each pocket positioned between two adjacent hinges of the plurality of hinges and each pocket of the plurality of pockets has an opening opposite the longitudinal centerline;

incorporating a plurality of spacer elements on the air filter media sheet, wherein at least one of the plurality of spacer elements is positioned within at least one of the plurality of pockets;

alternately folding the air filter media sheet along the plurality of hinges formed in the air filter media sheet to form a pleat block, wherein the plurality of spacer elements prevent folded sides of the air filter media sheet from contacting each other;

sealing all but one side of the pleat block; and attaching a polyurethane seal to the non-sealed side of the pleat block.

12. The method of claim 11, further comprising creating the plurality of hinges by scoring the air filter media sheet.

13. The method of claim 12, wherein a width of the formed score is approximately equal to two times the spacing between a front and a back layer of the air filter media sheet.

14. The method of claim 12, wherein the scoring is performed by a servo-controlled scoring mechanism.

15. The method of claim 11, further comprising creating the plurality of hinges by compressing and joining two layers of the air filter media sheet.

16. The method of claim 11, further comprising scoring the air filter media sheet along a longitudinal centerline of the air filter media sheet.

17. The method of claim 11, wherein the plurality of spacer elements comprise a polymer spacer mesh.

18. The method of claim 11, wherein an upstream thickness of each spacer element is greater than a downstream thickness of each spacer element in an air flow direction.

19. The method of claim 11, wherein the plurality of spacer elements comprise a bead or dots of adhesive.

20. The method of claim 11, wherein sealing all but one side of the pleat block is performed with ultrasonic welding.

* * * * *